United States Patent Office 3,541,133
Patented Nov. 17, 1970

3,541,133
METHOD FOR SYNTHESIZING MALONONITRILE
Dennis E. Johnson, Cambridge, Philip L. Levine, Lexington, and Wilmer L. Kranich, Worcester, Mass., assignors to Arthur D. Little, Inc., Cambridge, Mass., a corporation of Massachusetts
No Drawing. Continuation of application Ser. No. 597,200, Nov. 28, 1966. This application Apr. 3, 1969, Ser. No. 813,408
Int. Cl. C07c *121/22*
U.S. Cl. 260—465.8         2 Claims

ABSTRACT OF THE DISCLOSURE

A method for making malononitrile by first reacting HCN and $Cl_2$ and then contacting the reaction products with acetonitrile.

---

This is a continuation of application S.N. 597,200, filed Nov. 28, 1966, now abandoned.

This invention relates to the preparation of malononitrile.

Malononitrile, $CH_2(CN)_2$, is used primarily as an intermediate in the preparation of a number of organic compounds, and in particular in the synthesis of drugs and pharmaceuticals such as barbiturates, and in riot control gases of the benzaldehyde type.

By the method of this invention, essentially equal molar ratios of HCN and $Cl_2$ are reacted and the product ClCN and HCl then contacted with acetonitrile, at an elevated temperature, to form the desired $CH_2(CN)_2$. The byproduct HCl is carried along and later removed.

In the prior art, malononitrile has been made by reacting acetonitrile with cyanogen chloride (U.S. Pat. 2,553,406) or with hydrogen cyanide (U.S. Pat. 3,055,738). Of these methods, the route using cyanogen chloride apparently gave a much better theoretical yield (18%) than that which used hydrogen cyanide (4.6% maximum). However, this earlier method requires the synthesis of cyanogen chloride, its isolation and purification prior to its use in the synthesis of malononitrile. These additional steps add materially to the cost of the manufacture of malononitrile and contribute to the problems of handling the reaction intermediates inasmuch as all of them are toxic and corrosive.

It would be desirable to have a method for making malononitrile which could be carried out as a single process, thus eliminating the isolation of intermediates.

It is therefore a primary object of this invention to provide a method for making malononitrile which is essentially a single integrated process having two chemical reactions which are carried out sequentially without the need for the isolation or purification of any of the reactants. Another object is to provide a method of the character described which will give good yields of malononitrile. Other objects of the invention will in part be obvious and will in part be apparent hereinafter.

The invention accordingly comprises the several steps and the relation of one or more of such steps with respect to each of the others thereof, which will be exemplified in the method hereinafter disclosed, and the scope of the invention will be indicated in the claims.

The reactions involved in the preparation of malononitrile according to this invention may be written for convenience as two steps, although it is to be understood that they are carried out successively in what may be considered as a single apparatus.

$$HCN + Cl_2 \rightarrow ClCN + HCl \quad (1)$$
$$ClCN + CH_3CN \rightarrow CH_2(CN)_2 + HCl \quad (2)$$

Reaction (1) proceeds quantitatively to ClCN at about 200° C. over a charcoal catalyst, and no appreciable quantity of $(CN_2)$, cyanogen, is formed. For this reason, it is preferable to begin with essentially equal molar quantities of the HCN and $Cl_2$. As the gaseous stream of ClCN is formed, it is introduced (along with the byproduct HCl) into a quartz reaction tube. At the same time, the acetonitrile, $CH_3CN$, is also introduced into the quartz tube at the same end, and by maintaining the quartz tube at 700° C., the reactants of the confluent gas streams react according to reaction (2) to form the desired malononitrile. No decomposition product or products from side reactions have been found in the product stream. The by-product HCl in the reaction stream entering the quartz reaction tube has, as far as can be determined, no deleterious effects on the progress of the reaction.

The following example, which is meant to be illustrative and not limiting, is presented further to describe our invention.

EXAMPLE 1

Gaseous HCN and $Cl_2$ were added in an equimolar ratio at the rate of 45 cc./minute (STP) to a first reactor, which was a 15-cm. long Pyrex tube with an outside diameter of 10 mm., containing 10 cc. of activated coconut charcoal and maintained at a temperature of 200° C. in a thermoregulated tube furnace. Flow time through this first reactor was 6 seconds. The product ClCN and byproduct HCl gases were then introduced into one end of a quartz tube which had an effective volume of 26 cc. and which was maintained at a temperature of 700° C. by a second thermoregulated tube furnace. 3.9 grams of acetonitrile was added to the quartz tube reactor, and the flow time through this second reactor was approximately 5 seconds. The gas stream from the quartz tube was collected in Pyrex traps maintained at 0° C., and the product malononitrile was quantitatively measured in the resultant acetonitrile solution by nuclear magnetic resonance spectroscopy. The amount of acetonitrile which was recovered amounted to 3.5 grams, and the amount of product $CH_2(CN)_2$ was 0.56 gram. Thus there was a 10% conversion of the acetonitrile which could be recirculated with make-up, and an 87% yield of malononitrile based on the limiting HCN introduced into the reaction system.

Although somewhat lower reaction temperatures may be used, it will be with some sacrifice in final yield of the malononitrile. Thus temperatures between 100° C. and 250° C. may be used in the first reactor and temperatures between 600 and 750° C. in the second reactor. The reactions are preferably carried out at atmospheric pressures but superatmospheric pressures may be used.

Generally, the residence time of the reactants will be from 4 to 10 seconds in the first reactor and from 3 to 8 seconds in the second reactor.

It will thus be seen that the objects set forth above, among those made apparent from the preceding description, are efficiently attained and, since certain changes may be made in carrying out the above method without departing from the scope of the invention, it is intended that all matter contained in the above description shall be interpreted as illustrative and not in a limiting sense.

We claim:
1. A method for forming malononitrile in sequential steps without isolating the reactants, comprising the steps of
   (a) first reacting gaseous hydrogen cyanide and chlorine in essentially equal molar ratios over activated charcoal at a temperature between about 100 and 250° C. for a period of about 4 to 10 seconds in a first zone;
   (b) then reacting the resulting product mixture containing cyanogen chloride and by-product hydrogen chloride with acetonitrile for a period of from about 3 to 8 seconds and at a temperature between about 600 and 750° C. thereby to form malononitrile in a second zone in direct fluid communication with said first zone, the unreacted acetonitrile being recirculated with make-up acetonitrile for reaction in said second zone; and (c) isolating said product malononitrile.

2. A method according to claim 1 wherein the temperature during step (a) is about 200° C. and in step (b) is about 700° C.

References Cited

UNITED STATES PATENTS

| 2,391,490 | 12/1945 | Thurston et al. | 23—359 |
| 2,553,406 | 5/1951 | Dixon | 260—465.8 |
| 2,606,917 | 8/1952 | Dixon | 260—465.8 XR |

JOSEPH P. BRUST, Primary Examiner

U.S. Cl. X.R.

23—75